United States Patent
Liptak et al.

(10) Patent No.: US 9,373,980 B2
(45) Date of Patent: Jun. 21, 2016

(54) FULL-DUPLEX SIGNALING FOR ARC EVENT PROTECTION

(71) Applicants: Julius Michael Liptak, Knightdale, NC (US); John Kenneth Mackenzie, IV, Raleigh, NC (US)

(72) Inventors: Julius Michael Liptak, Knightdale, NC (US); John Kenneth Mackenzie, IV, Raleigh, NC (US)

(73) Assignee: SCHNEIDER ELECTRIC USA, INC., Schaumburg, IL (US)

( * ) Notice: Subject to any disclaimer, the term of this patent is extended or adjusted under 35 U.S.C. 154(b) by 557 days.

(21) Appl. No.: 13/654,988

(22) Filed: Oct. 18, 2012

(65) Prior Publication Data

US 2014/0111896 A1    Apr. 24, 2014

(51) Int. Cl.
*H02H 3/00* (2006.01)
*H02H 7/00* (2006.01)
*H02J 13/00* (2006.01)
*H02H 1/00* (2006.01)
*H02H 7/26* (2006.01)

(52) U.S. Cl.
CPC .......... *H02J 13/0062* (2013.01); *H02H 1/0023* (2013.01); *H02H 1/0084* (2013.01); *H02H 7/261* (2013.01); *Y02B 90/2638* (2013.01); *Y02E 60/725* (2013.01); *Y02E 60/7838* (2013.01); *Y04S 10/20* (2013.01); *Y04S 40/124* (2013.01)

(58) Field of Classification Search
CPC ........ H02H 3/02; H04L 7/0079; H04L 7/009; Y04S 40/124; Y04S 60/725
USPC ................................ 361/62, 63, 64
See application file for complete search history.

(56) References Cited

U.S. PATENT DOCUMENTS

| 607,239 | A | 7/1898 | Hlldburgh |
| 779,670 | A | 1/1905 | Shoemaker |
| 1,378,982 | A | 5/1921 | Shreeve |
| 5,517,172 | A | 5/1996 | Chiu |
| 5,701,226 | A | 12/1997 | Gelbien et al. |

(Continued)

FOREIGN PATENT DOCUMENTS

| WO | 9217017 A1 | 10/1992 |
| WO | 02068253 A1 | 9/2002 |

OTHER PUBLICATIONS

International Search Report mailed Dec. 3, 2013 in re PCT Application No. PCT/US2013/063477 filed Oct. 4, 2013.

(Continued)

*Primary Examiner* — Thienvu Tran
*Assistant Examiner* — Lucy Thomas
(74) *Attorney, Agent, or Firm* — Coats & Bennett, P.L.L.C.

(57) ABSTRACT

In a power protection and distribution assembly a trip system monitors electrical current and sends a current status signal to an arc flash protection system indicating whether current characteristic of an arc event is detected. The arc flash protection system evaluates this current status signal along with a light status signal indicating whether light characteristic of an arc event has been detected. Based on this evaluation, the arc flash protection system sends a control signal to the trip system for controlling the trip system to trip a breaker. The systems each include a full-duplex signaling module for sending the signals between the systems over a pair of conductors. Each signaling module sends one of the signals by modulating the magnitude of a current through or a voltage across the conductors, and receives the other signal by demodulating the magnitude of the current through or the voltage across the conductors, as distinctively modulated by the other signaling module.

6 Claims, 7 Drawing Sheets

(56) References Cited

U.S. PATENT DOCUMENTS

| | | | |
|---|---|---|---|
| 5,933,308 | A | 8/1999 | Garzon |
| 6,233,275 | B1 | 5/2001 | Townshend |
| 6,690,749 | B2 | 2/2004 | Townshend |
| 7,561,980 | B2 * | 7/2009 | Yen et al. ................... 702/117 |
| 7,791,846 | B2 * | 9/2010 | Roscoe et al. .................. 361/2 |
| 2006/0082220 | A1 * | 4/2006 | Karam et al. .................... 307/4 |
| 2010/0057386 | A1 | 3/2010 | Hillis et al. |

OTHER PUBLICATIONS

International Search Report and Written Opinion mailed Dec. 3, 2013 in re International Application No. PCT/US2013/063477 filed Oct. 4, 2013.

Second Written Opinion mailed Oct. 13, 2014 in re International Application No. PCT/US2013/063477 filed Oct. 4, 2013.

* cited by examiner

FULL-DUPLEX SIGNALING FOR ARC EVENT PROTECTION

FIELD OF INVENTION

The present invention generally relates to arc event protection, and particularly relates to full-duplex signaling between a trip system and an arc flash protection system.

BACKGROUND

A power protection and distribution assembly is typically installed at every building, factory, or similar facility, where the main electrical power from the grid enters the facility. The power protection and distribution assembly, sometimes referred to as "switchgear," usually includes an enclosure with a main circuit breaker at the electrical point furthest upstream, or closest to the external main power grid; a power distribution bus, which may comprise copper bars for each positive power phase and one or more ground bus bars; and one or more area circuit breakers, each protecting an electrical circuit distributing power to an area of the facility. The purpose of the circuit breakers is to protect downstream circuits from overcurrent conditions, such as would occur in the event of a short circuit.

A trip system trips a circuit breaker upon the detection of an overcurrent condition. One type of trip system detects an overcurrent condition by detecting excessive heat generated by large currents moving through resistive conductors. While such trip systems will interrupt a faulty circuit in time to avoid a fire, sensitive downstream electrical equipment may still be damaged by the overcurrent condition prior to current flow interruption.

Other functions of trip systems can provide a quicker circuit interruption operation of the main breaker prior to or during dangerous arcing events through interaction with an arc flash protection system. An arc event, i.e. current traveling through air, manifests itself visibly in the form of a spark, arc, flame, glow of molten metal, etc. that results from an arcing condition. When the arc flash protection system detects such an arc event, the system may operate an auxiliary arc diverter mechanism or send a control signal to the trip system directing the trip system to trip the main circuit breaker, or both.

The arc flash protection system detects an arc event when optical or other conditions characteristic of a flash are detected. The arc flash protection system detects light as one of these conditions. The trip system detects abnormal current flowing through the conductors as another one of the arcing conditions, and signals the condition to the arc flash protection system.

With signaling between the trip system and the arc flash protection system occurring within the electrical enclosure to prevent damage from arc flash occurrences, the ability of the systems to communicate status information, and therefore provide timely and accurate circuit interruption, depends on the speed and robustness of the signaling. Providing high speed and highly robust signaling, without meaningfully increasing the complexity and/or cost of the systems, or reducing same; has heretofore proven problematic.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

Due to the electromagnetic, spacing, and wiring constraints of an enclosed electrical distribution environment, it is desirable to provide robust signaling capabilities in order to maximize the efficiency and functionality for arc event protection in a power protection and distribution assembly. The present invention addresses these concerns with a full-duplex signaling arrangement between constituent trip and arc flash protection systems of the power protection and distribution assembly.

The following presents a simplified summary of the disclosure in order to provide a basic understanding to those of skill in the art. This summary is not an extensive overview of the disclosure. Nor is the summary intended to identify key/critical elements of embodiments of the invention or otherwise delineate the scope of the invention. The sole purpose of this summary is to present some concepts disclosed herein in a simplified form as a prelude to the more detailed description that is presented later.

One or more embodiments herein provide high speed and highly robust full-duplex signaling between a trip system and an arc flash protection system, without meaningfully increasing the complexity and cost of those systems. This high-speed, robust signaling facilitates timely and accurate tripping of an upstream circuit breaker to protect downstream circuits from damage.

More particularly, a trip system herein is configured to send a current status signal to an arc flash protection system indicating whether current characteristic of an arc event has been detected. The arc flash protection system evaluates this current status signal along with a light status signal indicating whether light characteristic of an arc event has been detected as well. Based on this evaluation, the arc flash protection system is configured to send a control signal to the trip system for controlling the trip system to trip the upstream breaker and thereby protect downstream circuits from damage.

The trip system and the arc flash protection system each include a full-duplex signaling module for simultaneously signaling the current status signal and the control signal between the systems over a pair of conductors coupling the systems together. Notably, each signaling module sends one of the signals by modulating the magnitude of a current through or a voltage across the pair of conductors, and receives the other signal by demodulating the magnitude of the current through or the voltage across the pair of conductors, as distinctively modulated by the other signaling module.

In some embodiments, for example, one of the signaling modules modulates the magnitude of the current through the pair of conductors, while the other one of the signaling modules modulates the magnitude of the voltage across the pair of conductors. In this case, the signaling between the modules is asymmetric in the sense that the modules do not modulate the same physical property. In other "symmetric" embodiments, by contrast, the signaling modules both modulate either the current through the pair of conductors or the voltage across the pair of conductors, but the modules do so in ways that are distinguishable.

Some asymmetric embodiments advantageously decouple voltage magnitude modulation by one of the signaling modules and current magnitude modulation by the other signaling module. In one embodiment, for example, the signaling module performing current magnitude modulation does so using an adjustable impedance circuit. Notably, this adjustable impedance circuit is configured to automatically self-adjust its impedance in order to substantially counteract any current magnitude modulation attributable to voltage magnitude modulation performed by the other signaling module. This means that signaling of the current status signal and signaling of the control signal remain substantially independent without having to introduce significant noise tolerance margins.

BRIEF DESCRIPTION OF THE DRAWINGS

Embodiments of the present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
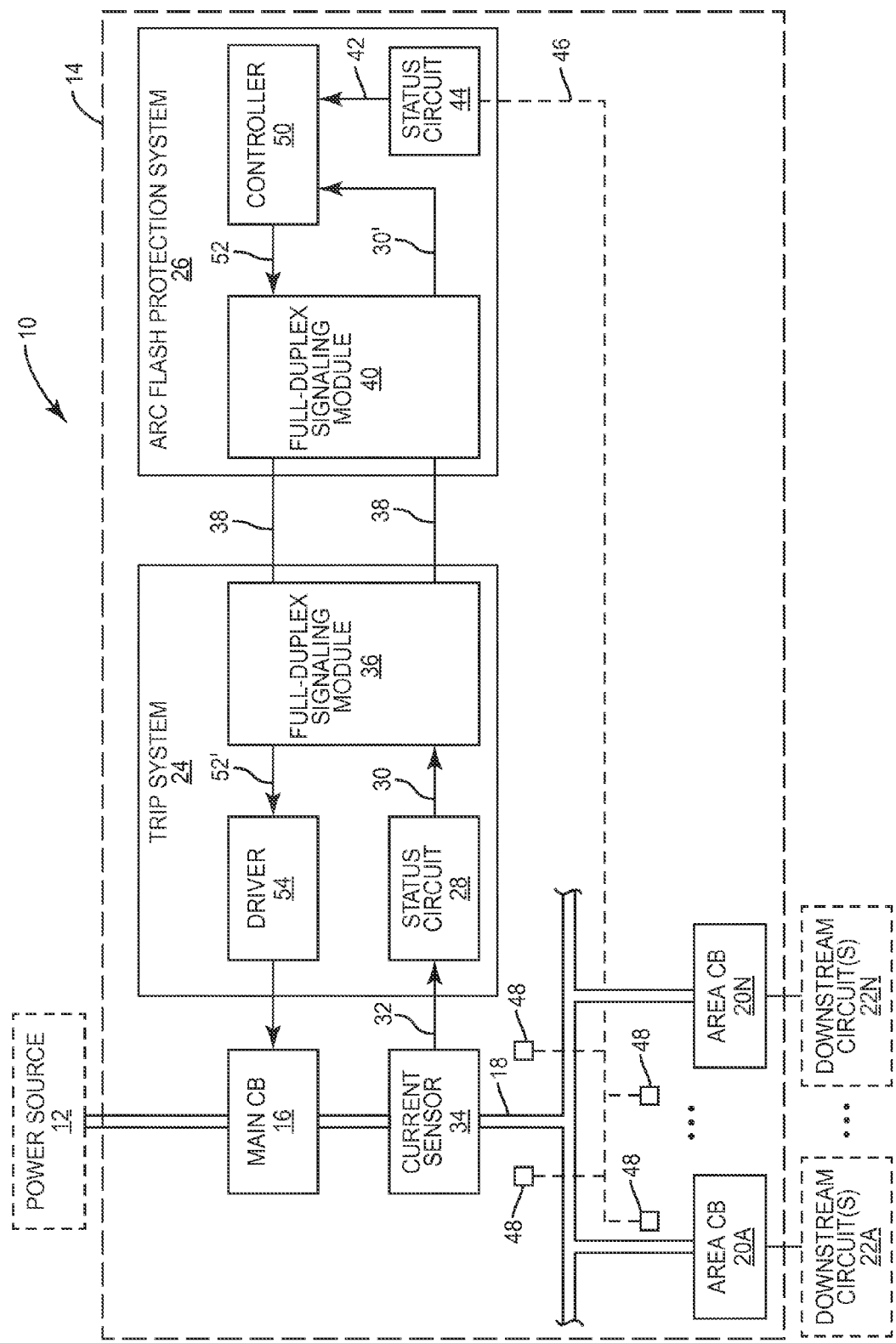
FIG. 1 is a block diagram of a power protection and distribution assembly configured according to one or more embodiments.

FIG. 1 depicts an exemplary power protection and distribution assembly 10 for a facility. Electrical power from a power source 12 is received by switchgear 14, which houses a main circuit breaker 16, power distribution bus 18, and one or more area circuit breakers 20A, 20B, . . . 20N. The main breaker 16 protects the entire facility, and is rated to pass the highest anticipated sustained current. The power distribution bus 18 may comprise solid copper bars capable of conducting large currents. Each area circuit breaker 20A, 20B, . . . 20N downstream from the main circuit breaker 16 is rated for a lower current, and distributes power to separate downstream circuits 22A, 22B, . . . 22N. Separate downstream circuits 22A, 22B, . . . 22N typically distribute electrical power to separate areas of the facility.

When the power distribution bus 18 (or one of its component parts) experiences a short circuit or an arc flash event, the main circuit breaker 16 may experience current flow in excess of its rated capacity. This is referred to as an overcurrent condition. The switchgear 14 includes a trip system 24 and an arc flash protection system 26 that are cooperatively configured to trip the main circuit breaker 16 when an overcurrent condition occurs, such as during the detection of an arc event. Tripping the main circuit breaker 16 in this way isolates the power distribution bus 18 from the power source 12 in a timely manner, before the power distribution bus 18 is damaged. The timeliness and accuracy of the breaker's tripping, though, depends on the speed and robustness of signaling between the trip system 24 and the arc flash protection system 26. One or more embodiments herein advantageously provide high speed and highly robust signaling, and thus timely and accurate breaker tripping, without meaningfully increasing the complexity and/or cost of the system 10.

In this regard, a status circuit 28 included in the trip system 24 is configured to generate a current status signal 30 indicating whether or not current characteristic of an arc event is detected. In some embodiments, for example, the status circuit 28 receives the output 32 of a current sensor 34 disposed in series with the main breaker 16. In this case, the status circuit 28 compares the sensor output 32 to a current level threshold that has been set to distinguish between a current level that is attributable to an arc event and a current level that is not. When the sensor output 32 indicates a current level that meets or exceeds the arcing threshold, the status circuit 28 generates the current status signal 30 to indicate that a current characteristic of an arc event has been detected. Otherwise, the status circuit 28 generates the current status signal 30 to indicate that such a current has not been detected.

The trip system 24 further includes a signaling module 36 that is configured to send the current status signal 30 to the arc flash protection system 26. The signaling module 36 is full-duplex in the sense that the module 36 can send the current status signal 30 to the arc flash protection system 26 while simultaneously receiving signaling from the arc flash protection system 26. Regardless, the signaling module 36 sends the current status signal 30 to the arc flash protection system 26 by modulating the magnitude of a current through or a voltage across a pair of conductors 38 coupling the trip system 24 to the arc flash protection system 26. The arc flash protection system 26 correspondingly includes a full-duplex signaling module 40 configured to receive the current status signal 30' from the trip system 24 by demodulating the magnitude of the current through or the voltage across the pair of conductors 38.

In addition to obtaining the current status signal 30' indicating whether or not current characteristic of an arc event is detected, the arc flash protection system 26 obtains a light status signal 42 indicating whether or not light characteristic of an arc event is detected. In at least some embodiments, the arc flash protection system 26 obtains this light status signal 42 by generating it based on the output 46 of one or more light sensors 48 disposed within the switchgear 14, e.g., proximal to the one or more area circuit breakers 20. In one such embodiment, for example, the arch flash protection system 26 includes a status circuit 44 configured to compare the sensor output 46 to a light level threshold that has been set to distinguish between a light level that is attributable to an arc event and a light level that is not. When the sensor output 46 indicates a light level that meets or exceeds the threshold, the status circuit 44 generates the light status signal 42 to indicate that light characteristic of an arc event has been detected. Otherwise, the status circuit 44 generates the light status signal 42 to indicate that such light has not been detected.

Based on the current status signal 30' received from the trip system 24 and the light status signal 42 generated by the status circuit 44, a controller 50 included in the arc flash protection system 26 generates a control signal 52 for controlling the trip system 24 to trip the main circuit breaker 16. In one embodiment, for example, the controller 50 generates the control signal 52 to direct the trip system 24 to trip the main breaker 16, responsive to the light status signal 42 and the current status signal 30' indicating that both light and current characteristic of an arc event have been detected. Otherwise, if either light or current characteristic of an arc event has not been detected, the controller 50 generates the control signal 52 to direct the trip system 24 to maintain its current state, i.e. no trip signal is generated.

Regardless, the arc flash protection system's full-duplex signaling module 40 sends this control signal 52 to the trip system 24 by modulating the magnitude of the current through or the voltage across the pair of conductors 38. Modulation performed by the arc flash protection system's full-duplex signaling module 40 in this regard is distinctive from the modulation performed by the trip system's full-duplex signaling module 36. In some embodiments, for example, one of the signaling modules 36, 40 modulates the magnitude of the current through the pair of conductors 38, while the other one of the signaling modules 36, 40 modulates the magnitude of the voltage across the pair of conductors 38. In this case, the signaling between the modules 36, 40 is asymmetric in the sense that the modules 36, 40 do not modulate the same physical property. In other "symmetric" embodiments, by contrast, the signaling modules 36, 40 both modulate either the current through the pair of conductors 38 or the voltage across the pair of conductors 38, but the modules 36, 40 do so in ways that are distinguishable.

With the arc flash protection system's signaling module 40 sending the control signal 52 by distinctively modulating the current through or the voltage across the pair of conductors 38, the trip system's signaling module 36 correspondingly receives the control signal 52' by demodulating that current or voltage. A driver 54 included in the trip system 24 is configured to trip the main breaker 16 in accordance with this control signal 52'. That is, the driver 54 either signals the main breaker 16 to trip or maintain the current state of the main breaker 16 depending on the command indicated by the control signal 52'.

Figure 2A:
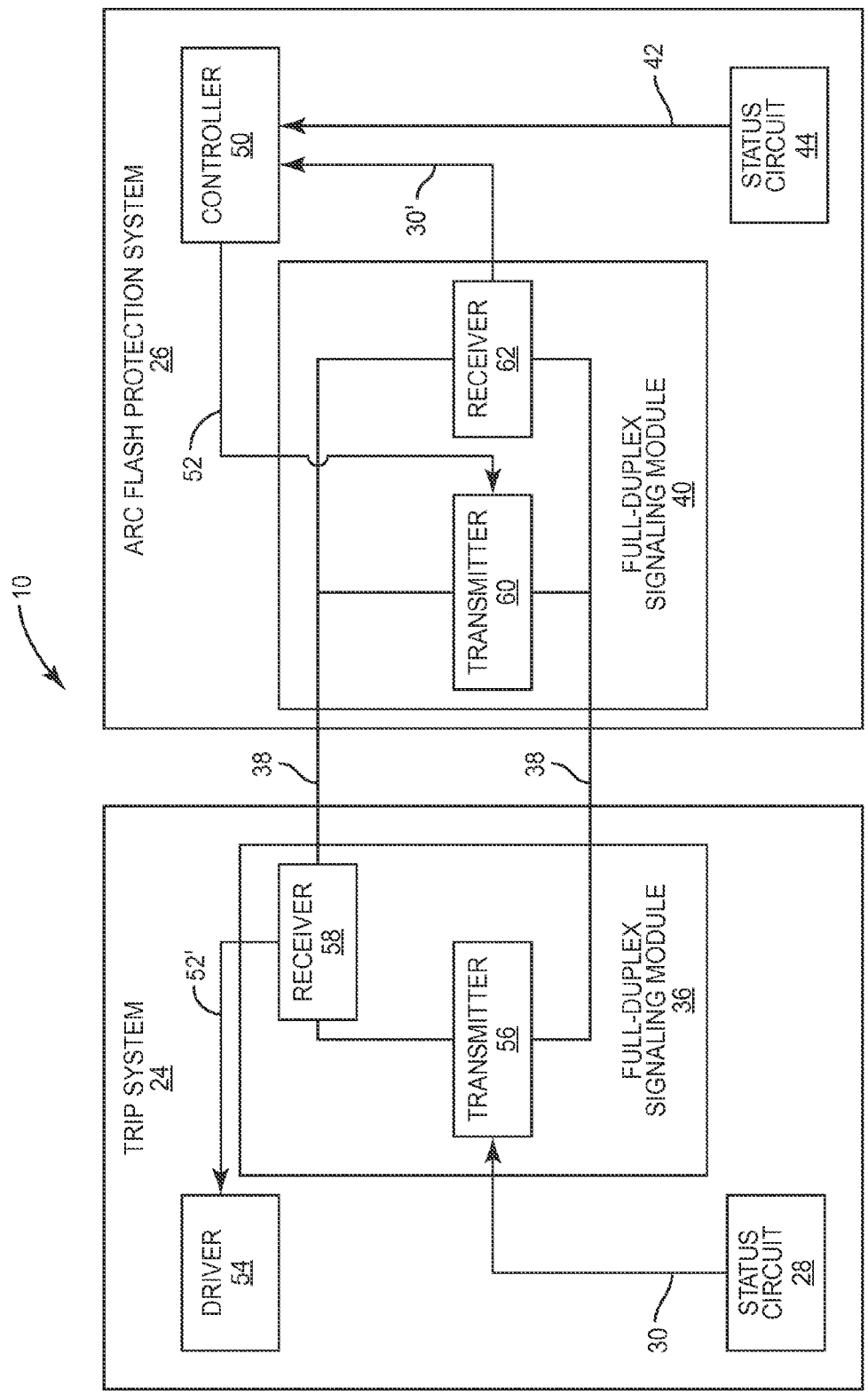
FIG. 2A is a block diagram of a trip system and arc flash protection system configured according to one or more asymmetric embodiments herein.

FIGS. 2A-2D illustrate additional details according to one or more asymmetric embodiments. As shown in FIG. 2A, the trip system's signaling module 36 includes a transmitter 56 in series with a receiver 58 between the conductors 38. The arc flash protection system's signaling module 40, by contrast, includes a transmitter 60 in parallel with a receiver 62 (and the conductors 38). The trip system's transmitter 56 sends the current status signal 30 by modulating the magnitude of the voltage across the conductors 38, while the trip system's receiver 58 receives the control signal 52' by demodulating the magnitude of the current through the conductors 38 (which is the same as the current through the trip system's transmitter 56). Correspondingly, the arc flash protection system's transmitter 60 sends the control signal 52 by modulating the magnitude of the current through the conductors 38, while the arc flash protection system's receiver 62 receives the current status signal 30' by demodulating the magnitude of the voltage across the conductors 38.

In some embodiments, demodulating the magnitude of the voltage across the conductors 38 entails the arc flash protection system's receiver 62 monitoring the full voltage across the conductors 38. As shown in FIG. 2A, for instance, the full voltage across the conductors 38 falls across the transmitter 60 and the receiver 62 monitors this full voltage. In other embodiments, though, demodulating the magnitude of the voltage across the conductors 38 entails the receiver 62 monitoring only a part of that full voltage. For example, where the full voltage across the conductors 38 is divided between the transmitter 60 and one or more other components (not shown) in series with the transmitter 60, demodulation may entail monitoring the voltage across one or more of those other components, or monitoring the voltage across the transmitter 60.

Figure 2B:
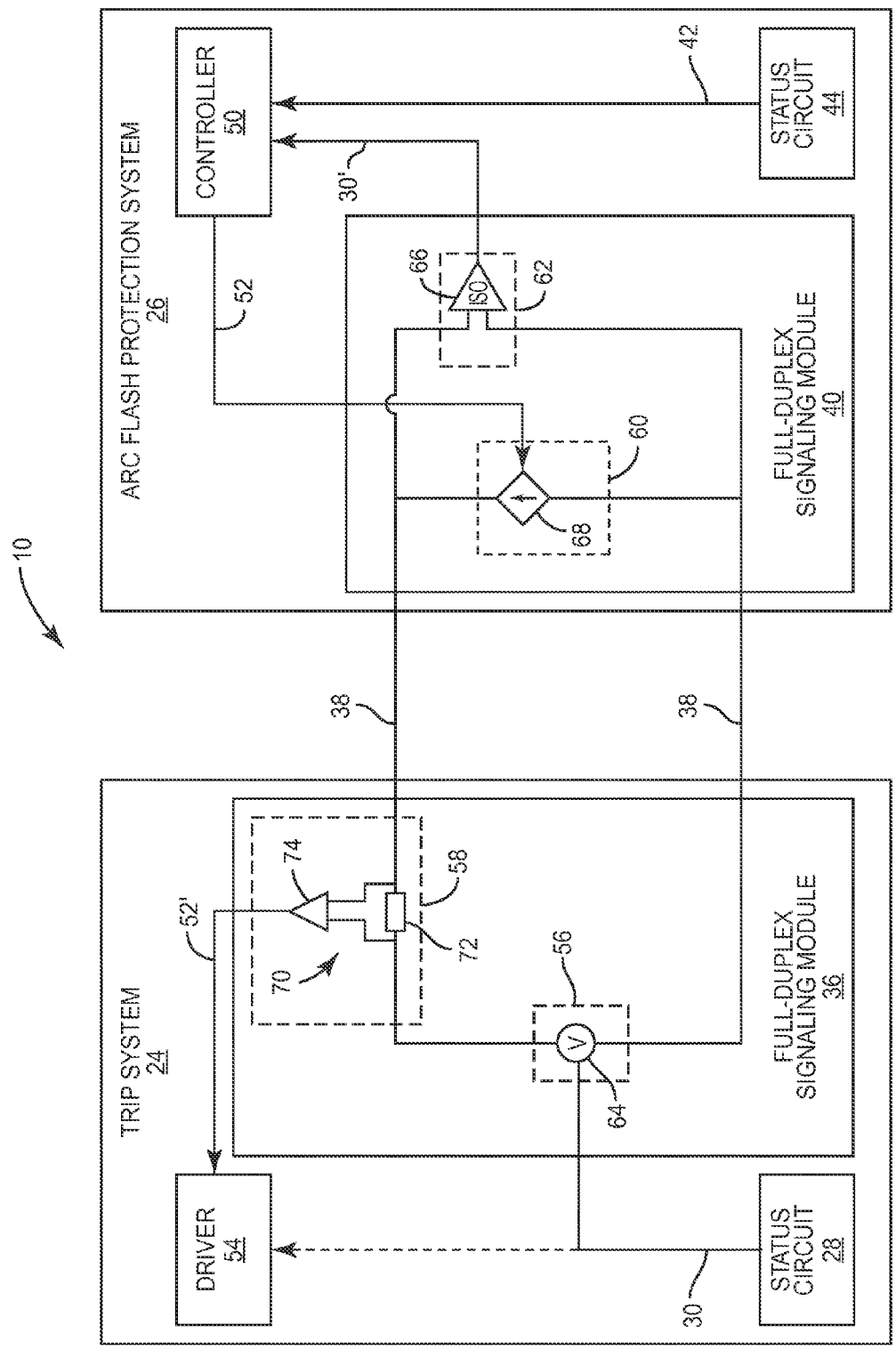
FIG. 2B is a schematic diagram illustrating one implementation of the asymmetric embodiment shown in FIG. 2A.

FIG. 2B illustrates one implementation of the asymmetric embodiment shown in FIG. 2A. In FIG. 2B, the trip system's transmitter 56 includes an adjustable voltage source 64. The transmitter 56 in this case is configured to modulate the magnitude of the voltage across the conductors 38 by adjusting the voltage output of the adjustable voltage source 64, responsive to the current status signal 30. The arc flash protection system's receiver 62 correspondingly includes a voltage sensor 66 (e.g., an analog isolator) configured to monitor the magnitude of the voltage across the conductors 38 for demodulation.

Also in FIG. 2B, the arc flash protection system's transmitter 60 includes an adjustable impedance circuit 68. The transmitter 60 in this case is configured to modulate the magnitude of the current through the conductors 38 by adjusting the impedance of the adjustable impedance circuit 68. The trip system's receiver 58 correspondingly includes a current sensor 70 configured to monitor the magnitude of this current for demodulation. As shown, the current sensor 70 comprises an operational amplifier 74 connected across a sensing element 72 such as a small shunt resistor.

In at least some embodiments, the adjustable impedance circuit 68 in FIG. 2B comprises a switchable impedance that is configured to selectively connect different fixed-valued impedances across the conductors 38, responsive to the control signal 52. In other embodiments, the adjustable impedance circuit 68 comprises a controllable impedance that is configured to vary in impedance responsive to the control signal 52.

Regardless of the particular implementation of the adjustable impedance circuit 68, the signaling modules 36, 40 in one or more embodiments are configured to tolerate at least some coupling between voltage magnitude modulation by the adjustable voltage source 64 and current magnitude modulation by the adjustable impedance circuit 68. In this case, when the adjustable voltage source 64 changes the magnitude of the voltage across the conductors 38 in order to send the current status signal 30, the magnitude of the current through the conductors 38 changes as well. Appropriate noise margins at the receiver 58, though, permit the receiver 58 to distinguish between current magnitude modulation attributable to the adjustable impedance circuit 68 sending the control signal 52 and current magnitude modulation incidentally attributable to the adjustable voltage source 64 sending the current status signal 30.

Figure 2C:
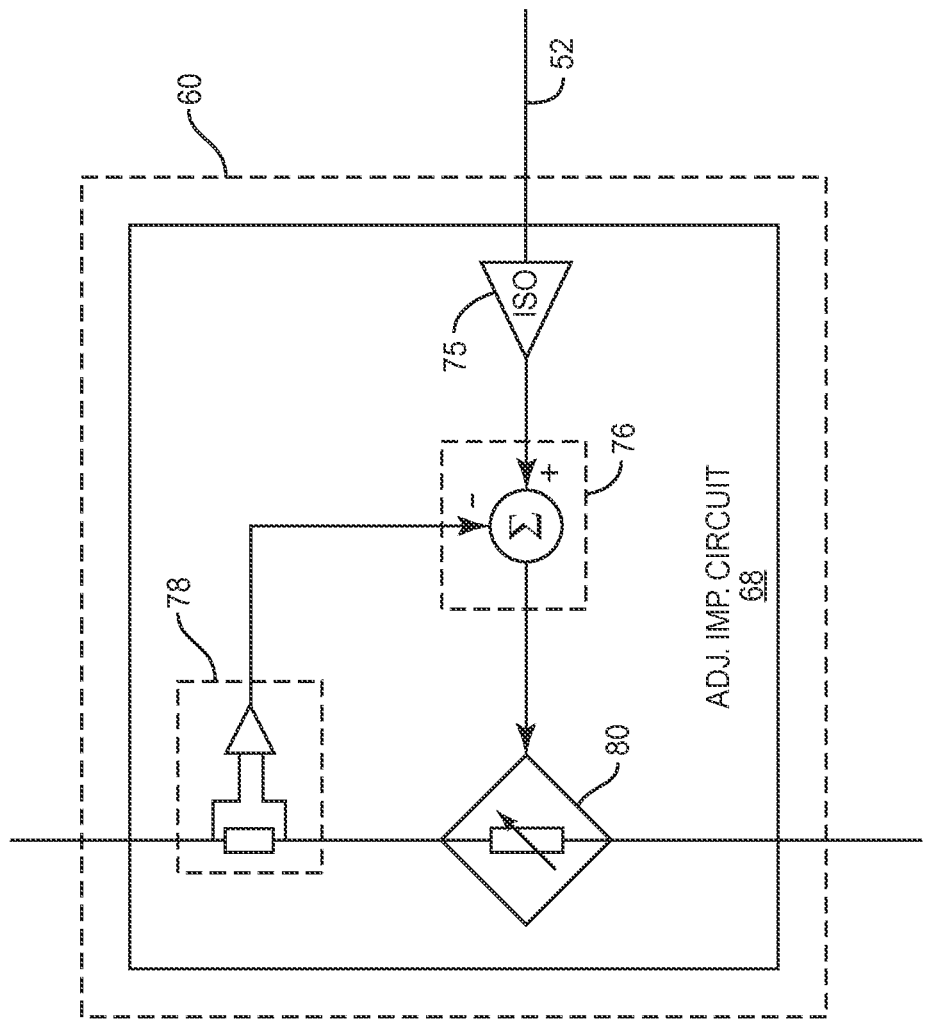
FIG. 2C is a schematic diagram of an adjustable impedance circuit shown in FIG. 2B, according to one or more embodiments.

FIG. 2C illustrates more sophisticated embodiments that substantially decouple voltage magnitude modulation by the adjustable voltage source 64 and current magnitude modulation by the adjustable impedance circuit 68. As shown in FIG. 2C, the arc flash protection system's transmitter 60 includes an adjustable impedance circuit 68 that is configured to automatically self-adjust its impedance in order to substantially counteract any modulation of the magnitude of the current through the conductors 38 attributable to modulation by the trip system 24 of the magnitude of the voltage across the conductors 38.

In particular, the adjustable impedance circuit 68 in FIG. 2C is configured to self-adjust its impedance as needed in order to regulate or otherwise maintain the current through the conductors 38 at a magnitude representative of the control signal 52. The circuit 68 in this regard includes a current sensor 78 (similar to current sensor 70) that is configured to monitor the magnitude of the current through the conductors 38. The circuit 68 also includes an impedance controller 76 that is configured to determine the difference between the current magnitude representative of the control signal 52 (e.g., via isolator 75) and the current magnitude through the conductors 38, as monitored by the current sensor 78. The impedance controller 76 controls an adjustable impedance 80 included in the circuit 68, as needed, to minimize this determined difference.

For example, when the trip system's transmitter 56 of FIG. 2B changes the magnitude of the voltage across the conductors 38 in order to send the current status signal 30, the impedance controller 76 of FIG. 2C observes this voltage magnitude change as a corresponding current magnitude change and controls the adjustable impedance 80 to counteract that change. Specifically, when the trip system's transmitter 56 of FIG. 2B increases the voltage magnitude across the conductors 38, the current magnitude through the conductors 38 increases above the current magnitude representative of the control signal 52. The impedance controller 76 responsively increases the impedance of the adjustable impedance 80 so that the current magnitude through the conductors 38 decreases back down to the current magnitude representative of the control signal 52. The impedance controller 76 conversely decreases the impedance of the adjustable impedance 80 responsive to the trip system's transmitter 56 decreasing the voltage magnitude across the conductors 38, so that the current magnitude through the conductors 38 increases back up to the current magnitude representative of the control signal 52. With voltage and current magnitude modulation advantageously decoupled in this way, voltage magnitude changes do not produce corresponding current magnitude changes. This means that signaling of the current status signal 30 and signaling of the control signal 52 remain substantially independent without having to introduce significant noise tolerance margins, especially when galvanic isolation is employed at one of the signaling modules 36, 40.

Consider a simple example where the signaling modules 36, 40 send the current status signal 30 and the control signal 52 by employing unipolar modulation between different discrete voltage and current magnitudes. In this case, the trip system's transmitter 56 is configured to set the voltage output of the adjustable voltage source 64 to a first voltage magnitude (e.g., 5V) in order to send a binary 0 as the current status signal 30 (e.g., indicating that current characteristic of an arc event has not been detected). The arc flash protection system's voltage sensor 66 senses the resulting voltage across the conductors 38. When this sensed voltage is within a first predefined voltage magnitude range (e.g., 4-6V), the controller 50 of FIG. 2B recognizes the sensed voltage as a binary 0 sent from the trip system's status circuit 30. Meanwhile, the arc flash protection system's adjustable impedance circuit 68 is configured to regulate the current through the conductors 38 to a first current magnitude (e.g., 4ma) in order to simultaneously send a binary 0 as the control signal 52 (e.g., indicating that the driver 54 is to maintain the current state of the main breaker 16). The trip system's current sensor 70 senses the resulting current through the conductors 38. When this sensed current falls within a first predefined current magnitude range (e.g., 3-5ma), the driver 54 recognizes the sensed current as a binary 0 sent from the controller 50.

Referring to FIG. 2B, at some point thereafter, the trip system's status circuit 28 switches from generating the current status signal 30 to indicate that current characteristic of an arc event has not been detected, to generating the current status signal 30 to indicate that such a current has been detected. The trip system's transmitter 56 correspondingly sets the voltage output of the adjustable voltage source 64 to a second voltage magnitude (e.g., 8V) in order to send a binary 1 as the current status signal 30. The arc flash protection system's voltage sensor 66 senses the resulting voltage across the conductors 38. If this sensed voltage falls within a second predefined voltage magnitude range (e.g., >7V, to provide a noise margin between 6-7V), the controller 50 recognizes the sensed voltage as a binary 1 sent from the trip system's status circuit 30. Meanwhile, the arc flash protection system's adjustable impedance circuit 68 automatically self-adjusts its impedance in order to maintain the current through the conductors 38 at the first current magnitude (e.g., 4ma), despite the change in the voltage magnitude across the conductors 38. This way, the trip system's current sensor 70 continues to sense current within the first predefined current magnitude range, and the driver 54 continues to recognize the sensed current as a binary 0 sent from the controller 50 so as to maintain the current state of the main breaker 16 unless directed to do so by the controller 50.

That said, if the light status signal 42 indicates that light characteristic of an arc event is detected as well, then the controller 50 generates the control signal 52 to indicate that the driver 54 is to signal a trip of the main breaker 16. The arc flash protection system's adjustable impedance circuit 68 correspondingly adjusts in impedance (e.g., decreases) so that the current through the conductors 38 changes from the first current magnitude (e.g., 4ma) to a second current magnitude (e.g., 10ma) associated with a binary 1. The trip system's current sensor 70 senses this change in current through the conductors 38. If the resulting current falls within a second predefined current magnitude range (e.g., >8ma, to provide a noise margin between 5-8ma), the driver 54 recognizes the sensed current as a binary 1 sent from the controller 50. The driver 54 then trips the main breaker 16.

As a practical matter, though, the driver 54 in some embodiments is configured to selectively ignore (blank) the current output of the trip system's receiver 58 for a predefined duration after a state change of the current status signal 30'. This way, the driver 54 tolerates the amount of time needed in practice for the arc flash protection system's adjustable impedance circuit 68 to respond to the voltage magnitude modulation associated with that state change. The predefined duration in one or more embodiments therefore corresponds to the longest expected settling time of the adjustable impedance circuit 68. This duration may be kept small by judicious adjustment of response times. The same selective ignoring may similarly extend to the arc flash protection system's controller 50, in order to tolerate the settling time of the adjustable voltage source 64.

Note, too, that the embodiments just described prove particularly convenient for supervising the integrity of the signaling path provided by the conductors 38 between the modules 36, 40. In some embodiments, for example, the arc flash protection system's controller 50 or an integrity monitoring circuit (not shown) included in the arc flash protection system's receiver 62 monitors for whether the voltage across the conductors 38 falls within a third predefined voltage magnitude range (e.g., 0-3V, to provide noise margin between 3-4V). If the voltage falls within this range, the integrity of the signaling path has been compromised and a signaling path error is declared. Additionally or alternatively, the trip system's driver 54 or an integrity monitoring circuit (not shown) included in the trip system's receiver 58 monitors for whether the current through the conductors 38 falls within a third predefined current magnitude range (e.g., 0-2ma, to provide noise margin between 2-3ma). If the current falls within this range, the integrity of the signaling path has been compromised and a signaling path error is declared.

While the above embodiments described the signaling modules 36, 40 as employing unipolar magnitude modulation, the modules 36, 40 may be configured in other embodiments for bipolar magnitude modulation. Further, although the above embodiments employed certain separation bands or noise margins between different discrete levels representative of different magnitude modulation states, these separation bands may be arbitrarily adjusted to achieve optimal noise immunity. Still further, although the current status signal 30 and the control signal 52 were described above as being represented by a single change in state of the voltage or current magnitude, the signals 30, 52 in other embodiments may be represented by a train of state changes. Moreover, although the signaling modules 36, 40 were described above as using modulation between different discrete voltage and current magnitudes, the modules 36, 40 in other embodiments use modulation between different continuous voltage and current magnitudes. The rapidity of such modulation is limited only by the response times of the transmitters 56, 60, the response times of the receivers 58, 62, and the transmission characteristics of the conductors 38.

Figure 2D:
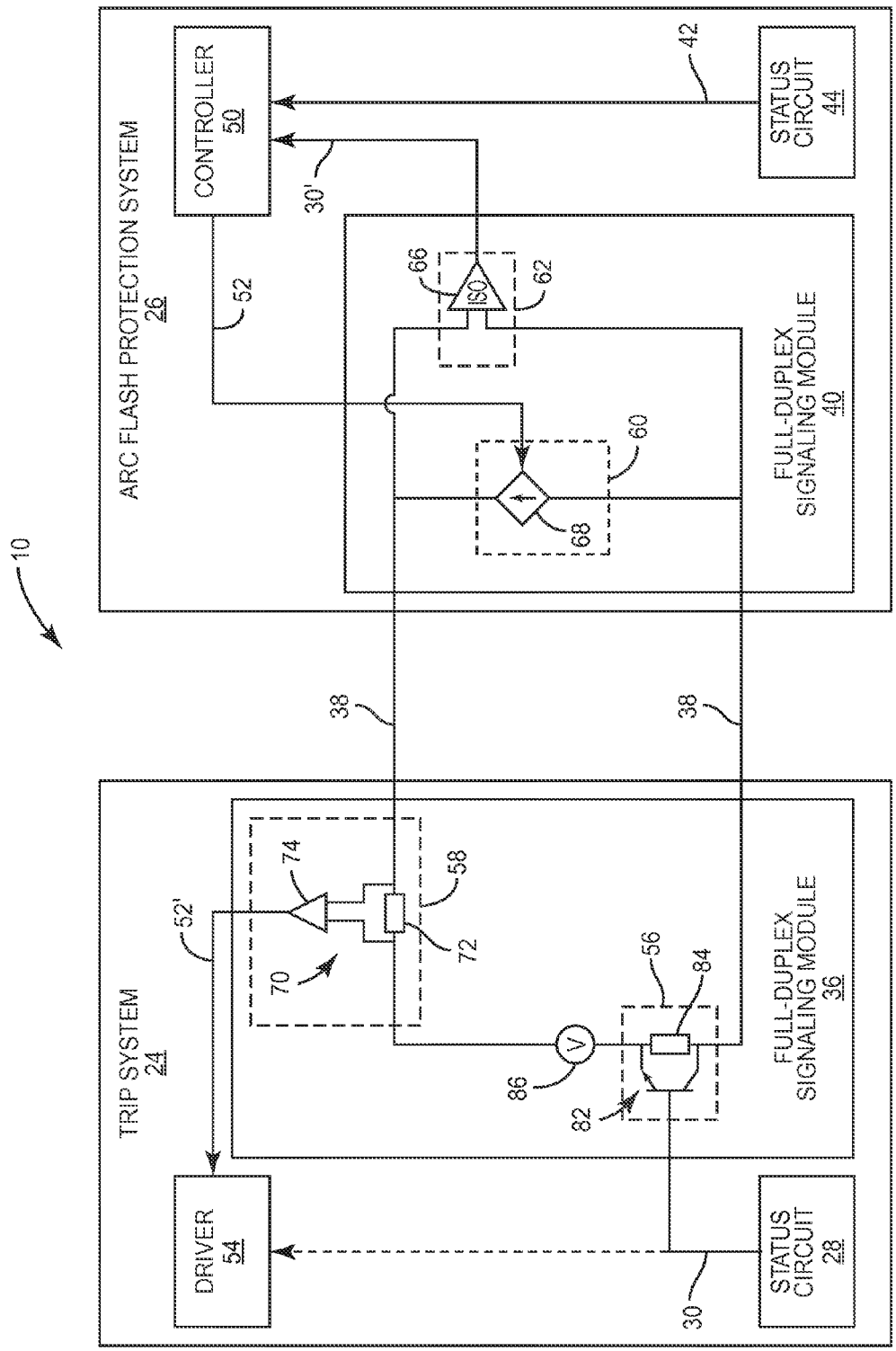
FIG. 2D is a schematic diagram illustrating a different implementation of the asymmetric embodiment shown in FIG. 2A.

Contrasted with FIG. 2B, FIG. 2D illustrates a different implementation of the asymmetric embodiment shown in FIG. 2A. Rather than the trip system's transmitter 56 including an adjustable voltage source 64, the transmitter 56 comprises an impedance circuit 82. The transmitter 56 is configured to modulate the magnitude of the voltage across the conductors 38 by adjusting the impedance of the impedance circuit 82, responsive to the current status signal 30. As shown, for example, the impedance circuit 82 includes switched impedance element 84 that is in series with a fixed voltage source 86. FIG. 2D is otherwise the same as FIG. 2B.

The asymmetric embodiments discussed above prove advantageous in achieving highly robust full-duplex signaling. For example, the asymmetric embodiments achieve high overall noise immunity by permitting the separation bands of logic high and low signal levels to be arbitrarily adjusted. In at least some contexts, though, the asymmetric embodiments prove more complex in terms of their hardware requirements and backwards compatibility than the symmetric embodiments herein. These symmetric embodiments still prove advantageous in terms of their robustness, albeit to a lesser extent than the asymmetric embodiments.

Figure 3A:
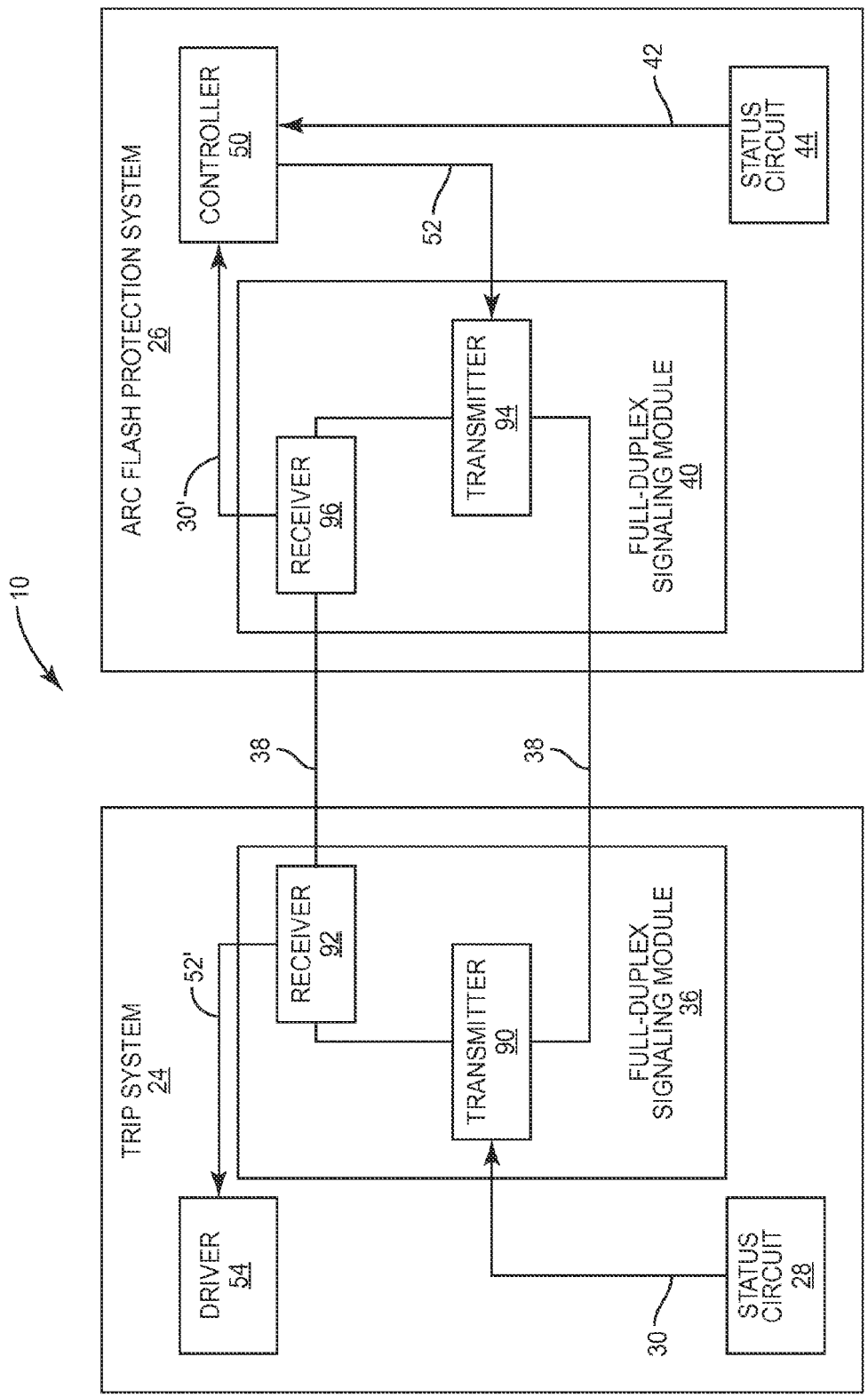
FIG. 3A is a block diagram of a trip system and arc flash protection system configured according to one or more symmetric embodiments herein.
Figure 3B:
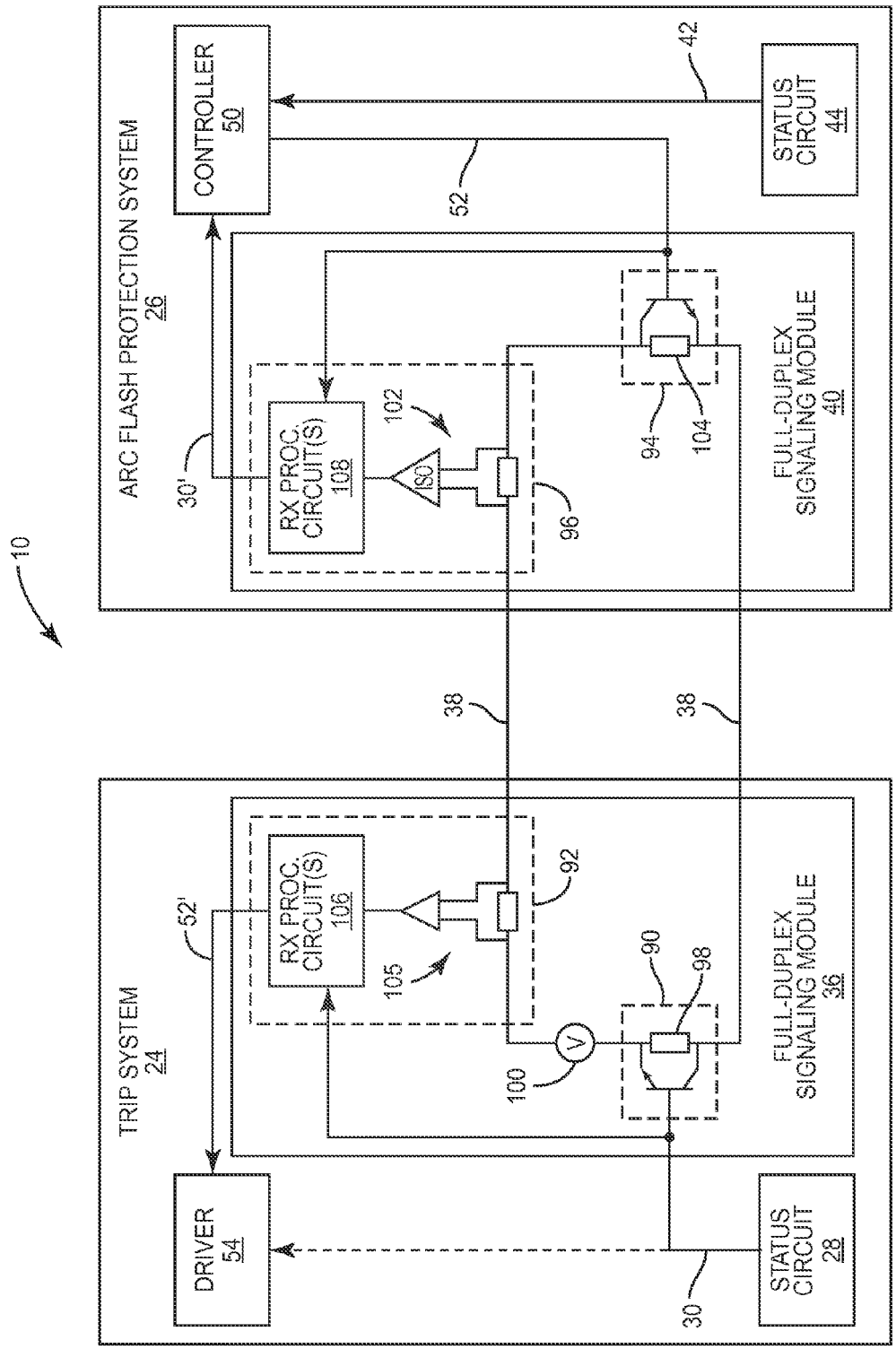
FIG. 3B is a schematic diagram illustrating one implementation of the symmetric embodiment shown in FIG. 3A.

FIGS. 3A-3B illustrate additional details according to one or more symmetric embodiments. As shown in FIG. 3A, the trip system's signaling module 36 includes a transmitter 90 in series with a receiver 92 between the conductors 38. The arc flash protection system's signaling module 40 likewise includes a transmitter 94 in series with a receiver 96 between the conductors. The trip system's transmitter 90 is configured to send the current status signal 30 by modulating the magnitude of the current through the conductors 38, while the trip system's receiver 92 is configured to receive the control signal 52' by demodulating the magnitude of the current through the conductors 38, as distinctively modulated by the arc flash protection system's transmitter 94. Correspondingly, the arc flash protection system's transmitter 94 is configured to send the control signal 52 by modulating the magnitude of the current through the conductors 38, while the arc flash protection system's receiver 96 is configured to receive the current status signal 30' by demodulating the magnitude of the current through the conductors 38, as distinctively modulated by the trip system's transmitter 90.

FIG. 3B illustrates one implementation of the symmetric embodiment shown in FIG. 3A. In FIG. 3B, the trip system's transmitter 90 includes a switched impedance element 98 that is in series with a fixed voltage source 100. The transmitter 90 in this case is configured to modulate the magnitude of the current through the conductors 38 by switching the transistor associated with the switched impedance element 98, responsive to the current status signal 30. The arc flash protection system's receiver 96 correspondingly includes a current sensor 102 configured to monitor the magnitude of the current through the conductors 38 for demodulation.

Similarly, the arc flash protection system's transmitter 94 includes a switched impedance element 104. The transmitter 94 is configured to modulate the magnitude of the current through the conductors 38 by switching the transistor associated with the switched impedance element 104, responsive to the control signal 52. The trip system's receiver 92 correspondingly includes a current sensor 105 configured to monitor the magnitude of the current through the conductors 38 for demodulation.

In at least some embodiments, the trip system's receiver 92 is configured to distinguish modulation of the current by the arc flash protection system's transmitter 94 from modulation of the magnitude of the current by the trip system's own transmitter 90, based on a state or change in state of the current status signal 30. As shown, for example, the receiver 92 includes one or more receiver processing circuits 106 configured to receive the current status signal 30 from the status circuit 28 and to identify current magnitude modulations imposed by the arc flash protection system's transmitter 94 as a function of that signal 30. The arc flash protection system's receiver 96 similarly includes one or more receiver processing circuits 108 configured to receive the control signal 52 and to identify current magnitude modulations imposed by the trip system's transmitter 90 as a function of that signal 52.

Those skilled in the art will appreciate that the signaling modules 36, 40 herein are effectively interchangeable between the trip system 24 and the arc flash protection system 26. In some embodiments, for example, the trip system's signaling module 36 sends the current status signal 30 in the same way that the flash protection system's signaling module 40 was described above as sending the control signal 52. Likewise, the flash protection system's signaling module 40 sends the control signal 52 in the same way that the trip system's signaling module 36 was described above as sending the current status signal 52.

Those skilled in the art should appreciate that, while the Figures illustrated the status circuits 28, 44 as being implemented within the trip system 24 and the arc flash protection system 26 outside of the respective signaling modules 36, 40, the status circuits 28, 44 may alternatively be implemented within those signaling modules 36, 40.

Those skilled in the art will also appreciate that, although the Figures illustrate the trip system 24 and arc flash protection system 26 in isolation, embodiments herein extend to scenarios where at least one of the systems 24, 26 is interconnected to one or more other trip systems and/or one or more other arc flash protection systems. For example, multiple trip systems may be connected in series between paired conductors for controlling the tripping of different circuit breakers according to different control signals received from the arc flash protection systems. Appropriate selection of individual voltage magnitude ranges for the different trip systems 24 would allow the arc flash protection system 26 to uniquely distinguish different current status signals received from the different systems 24. Similarly, multiple arc flash protection systems 26 may be connected to the same trip system 24 by different pairs of conductors 38. Appropriate selection of individual current magnitude ranges for different arc flash protection systems 26 would allow the trip system 24 to uniquely distinguish different control signals received from the different systems 26. Of course, various combinations of these embodiments are also envisioned herein.

Those skilled in the art will further appreciate that the pair of conductors 38 herein may consist of any type of conductors. In one embodiment, though, the conductors 38 comprise a twisted pair of wires. In other embodiments, the conductors 38 comprise a coaxial cable.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A power protection and distribution assembly comprising an arc flash protection system configured to control a trip system to conditionally trip an upstream circuit breaker to isolate a power distribution bus or one of its component parts from a power source, wherein the arc flash protection system comprises:
    a status circuit configured to generate a light status signal indicating whether or not light characteristic of an arc event is detected;
    a full-duplex signaling module comprising a transmitter in series with a receiver between a pair of conductors, wherein the pair of conductors couples the arc flash protection system to the trip system, wherein the receiver is configured to receive a current status signal from the trip system by demodulating the magnitude of a current through the pair of conductors, the current status signal indicating whether or not current characteristic of an arc event is detected by the trip system; and
    a controller configured to generate, based on the light status signal and the current status signal, a control signal for controlling the trip system;
    wherein the transmitter of the full-duplex signaling module is configured to send the control signal to the trip system by distinctively modulating the magnitude of a voltage across the pair of conductors.

2. The power protection and distribution assembly of claim 1, wherein the transmitter comprises an adjustable voltage source and is configured to modulate the magnitude of the voltage across the pair of conductors by adjusting a voltage output of the adjustable voltage source.

3. The power protection and distribution assembly of claim 1, wherein the transmitter comprises an impedance circuit, and wherein the transmitter is configured to modulate the magnitude of the voltage across the pair of conductors by adjusting the impedance of the impedance circuit.

4. A power protection and distribution assembly comprising an arc flash protection system configured to control a trip system to conditionally trip an upstream circuit breaker to isolate a power distribution bus or one of its component parts from a power source, wherein the arc flash protection system comprises
    a status circuit configured to generate a light status signal indicating whether or not light characteristic of an arc event is detected;
    a full-duplex signaling module comprising a transmitter in parallel with a receiver and a pair of conductors, wherein the pair of conductors couples the arc flash protection system to the trip system, and wherein the receiver is configured to receive a current status signal from the trip system by demodulating the magnitude of the voltage across the pair of conductors, the current status signal indicating whether or not current characteristic of an arc event is detected by the trip system; and
    a controller configured to generate, based on the light status signal and the current status signal, a control signal for controlling the trip system;
    wherein the transmitter of the full-duplex signaling module is configured to send the control signal to the trip system by distinctively modulating the magnitude of a current through the pair of conductors.

5. The power protection and distribution assembly of claim 4, wherein the transmitter comprises an adjustable impedance circuit and is configured to modulate the magnitude of the current through the pair of conductors by adjusting the impedance of the adjustable impedance circuit.

6. The power protection and distribution assembly of claim 5, wherein the adjustable impedance circuit is configured to automatically self-adjust its impedance in order to substantially counteract any modulation of the magnitude of the current through the pair of conductors attributable to modulation by trip system of the magnitude of the voltage across the pair of conductors.

* * * * *